UNITED STATES PATENT OFFICE.

ERNST STÖFFLER, OF ZURICH, SWITZERLAND.

MANUFACTURE OF LIME AND SAND BRICKS OR BLOCKS.

No. 802,608.        Specification of Letters Patent.        Patented Oct. 24, 1905.

Application filed May 16, 1904. Serial No. 208,231.

*To all whom it may concern:*

Be it known that I, ERNST STÖFFLER, a subject of the German Emperor, residing at 72 Forchstrasse, Zurich, Switzerland, have invented new and useful Improvements in the Manufacture of Lime and Sand Bricks or Blocks; and I do hereby declare that the following is a full, clear, and exact description of the invention, which will enable others skilled in the art to which it appertains to make and use the same.

In the preparation of molded articles from mortar of lime and sand the disadvantage is met with that the freshly-made molded articles are generally not sufficiently cohesive. Endeavors have been made to obviate this disadvantage in various ways—for example, by employing finely-ground sand. As this, however, mostly has clay adhering to it which clogs or forms concretions it is very difficult to effect the necessary intimate mixture of the lime with the sand mass, and lumps of clay and lime are frequently met with in the mixture. To overcome this difficulty, the lime and sand have been mixed together in the presence of water or steam in closed heated vessels, or the lime has been ground and used in this condition in the mixing process for the purpose of easier distribution. These methods form to a certain extent an advance upon the older method, but still do not provide a mortar which is sufficiently homogeneously mixed, or the preparation of the mortar is too troublesome.

Now the object of this invention is to provide a better mortar and better molded articles of lime and sand than have been obtained heretofore. To this end the lime is distributed in the lime and sand mass as efficiently as possible, this being effected by finely grinding a mixture of sand and caustic lime with the addition of water or steam. By grinding the sand in the mixture it is found that on breaking up the sand grains all the particles thereof are inclosed in a layer of slaked lime, and a very intimately-mixed fat mortar is obtained. The surfaces of fracture of the sand grains are rough and by reason of being completely inclosed in the lime are more suitable for molding. This mixing and grinding process can be carried out either in open vessels or in a closed disintegrating device, which may be inclosed in a steam-tight jacket, and the slaking of the lime can take place under steam-pressure. In this manner the hardening process, which after the forming is finished in a hardening-boiler, is already initiated, and the hydrate of lime reacts in *statu nascendi* more actively on the surface of the sand grains than when slaked lime, hydrate, and sand are mixed together. One result of this method of procedure is a considerable shortening of the time required for hardening the molded bricks or blocks and that in certain circumstances the molded articles can be treated as marketable products without steam-hardening. This condition of the bricks or blocks thus made under pressure is due to the fact that on grinding the mixture of sand and slaked lime a disintegration of the sand begins to take place in the mill. By the continued disintegration of the sand and as on grinding fresh particles of lime are constantly brought into contact with the sand and a high pressure with generation of steam and heat is produced in the drum by the slaking of the lime so large a quantity of binding material in the form of silicate of lime is formed that as soon as the grinding and forming processes are finished the molded article has hardened to a hard resonant brick or block.

The manufacture of such bricks or blocks is effected as follows: A mixture of sand and caustic lime is ground in open or closed steam-tight vessels with the addition of water or steam and the ground product made into bricks. The bricks possess sufficient rigidity to permit of their being placed without damage in drying-frames, the duration of the steam-hardening process depending upon the quantity of silicate of lime formed in the mortar. The bricks or blocks become after a short exposure to the air so hard and rigid that they are as resonant as burned bricks or hardened lime-sand bricks and can be used for building purposes.

Having now particularly described and ascertained the nature of my said invention and in what manner the same is to be performed, I declare that what I claim is—

1. The herein-described process for the manufacture of bricks or blocks of lime and sand, which consists in grinding sand and caustic lime together, so as to fracture the sand particles, with the addition of only so much moisture as will form a nearly-dry mixture and producing a chemical combination between the lime and fractured sand particles in nascent condition, then molding the mass into blocks without further treatment, substantially as described.

2. The herein-described process for the manufacture of bricks or blocks of lime and sand, which consists in grinding sand and caustic lime together so as to fracture the sand particles, introducing steam into the mixture while it is being ground to simultaneously supply moisture thereto, facilitate the chemical combination of the sand and lime, and partially harden the mass during the grinding operation, and producing a chemical combination between the lime and the freshly-fractured sand particles in nascent condition, substantially as described.

ERNST STÖFFLER.

Witnesses:
ALBERTO BELLIGE,
JOSEPH ABBONDIO.